United States Patent
Zhang et al.

(10) Patent No.: US 9,838,944 B2
(45) Date of Patent: *Dec. 5, 2017

(54) QUALITY OF SERVICE CONTROL IN MULTIPLE HOP WIRELESS COMMUNICATION ENVIRONMENTS

(71) Applicant: Apple Inc., Cupertino, CA (US)

(72) Inventors: Hang Zhang, Nepean (CA); Peiying Zhu, Kanata (CA); Wen Tong, Ottawa (CA); Nimal Gamini Senarath, Nepean (CA); Derek Yu, Kanata (CA); David G. Steer, Nepean (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/473,815

(22) Filed: Mar. 30, 2017

(65) Prior Publication Data

US 2017/0208530 A1 Jul. 20, 2017

Related U.S. Application Data

(63) Continuation of application No. 15/149,739, filed on May 9, 2016, now Pat. No. 9,629,061, which is a
(Continued)

(51) Int. Cl.
*H04W 4/00* (2009.01)
*H04L 12/28* (2006.01)
(Continued)

(52) U.S. Cl.
CPC .......... *H04W 40/12* (2013.01); *H04B 7/2606* (2013.01); *H04L 12/4633* (2013.01);
(Continued)

(58) Field of Classification Search
CPC ..... H04L 47/00; H04L 47/24; H04L 47/2441; H04L 2001/0097
See application file for complete search history.

(56) References Cited

U.S. PATENT DOCUMENTS 5,586,119 A    12/1996   Scribano et al.
7,062,566 B2 *   6/2006   Amara ................ H04L 12/4645
                                                        370/395.21
(Continued)

FOREIGN PATENT DOCUMENTS

EP         1069736       1/2001
JP         2001230862       8/2001
(Continued)

OTHER PUBLICATIONS

English Translation of Japanese Office Action, Application No. 2010-515630, dated Feb. 7, 2012, 6 pages.
(Continued)

*Primary Examiner* — Afshawn Towfighi
(74) *Attorney, Agent, or Firm* — Meyertons, Hood, Kivlin, Kowert & Goetzel, P.C.

(57) ABSTRACT

A wireless communication access path exists between an ingress station and an egress station. A logical communication tunnel is established between the ingress and egress stations directly or through any number of intermediate relay stations to handle session flows of PDUs. As PDUs arrive, the ingress station may determine and add information bearing on an identified QoS associated with the PDU to the PDUs before they are delivered to the downstream egress station(s) or intermediate relay station(s). The information may be used by the downstream stations to schedule the PDUs for further delivery. The information may also be used by the egress station to schedule the PDUs for delivery.

20 Claims, 12 Drawing Sheets

Related U.S. Application Data continuation of application No. 14/623,336, filed on Feb. 16, 2015, now Pat. No. 9,351,200, which is a continuation of application No. 13/632,366, filed on Oct. 1, 2012, now Pat. No. 8,958,300, which is a continuation of application No. 12/172,899, filed on Jul. 14, 2008, now Pat. No. 8,305,897.

(60) Provisional application No. 61/033,067, filed on Mar. 3, 2008, provisional application No. 60/949,767, filed on Jul. 13, 2007.

(51) Int. Cl.

| | | |
|---|---|---|
| *G01R 31/08* | (2006.01) | |
| *H04W 40/12* | (2009.01) | |
| *H04W 28/18* | (2009.01) | |
| *H04B 7/26* | (2006.01) | |
| *H04L 12/46* | (2006.01) | |
| *H04L 29/06* | (2006.01) | |
| *H04W 16/26* | (2009.01) | |
| *H04W 28/24* | (2009.01) | |
| *H04W 72/04* | (2009.01) | |
| *H04W 76/02* | (2009.01) | |
| *H04W 84/04* | (2009.01) | |
| *H04W 84/12* | (2009.01) | |

(52) U.S. Cl.
CPC ............ *H04L 69/22* (2013.01); *H04W 16/26* (2013.01); *H04W 28/18* (2013.01); *H04W 28/24* (2013.01); *H04W 72/042* (2013.01); *H04W 72/0413* (2013.01); *H04W 76/022* (2013.01); *H04W 84/047* (2013.01); *H04W 84/12* (2013.01)

(56) References Cited

U.S. PATENT DOCUMENTS

| | | |
|---|---|---|
| 7,322,033 B2 | 1/2008 | Ito |
| 7,558,201 B2 | 7/2009 | Sang et al. |
| 7,706,403 B2 | 4/2010 | Hosein |
| 8,116,256 B2 | 2/2012 | Zhu et al. |
| 2004/0083295 A1 | 4/2004 | Amara et al. |
| 2004/0203787 A1 | 10/2004 | Naghian |
| 2005/0014464 A1 | 1/2005 | Larsson |
| 2005/0111361 A1 | 5/2005 | Hosein |
| 2007/0072604 A1* | 3/2007 | Wang ............... H04B 7/155 455/428 |
| 2009/0016259 A1 | 1/2009 | Zhang et al. |

FOREIGN PATENT DOCUMENTS

| | | |
|---|---|---|
| JP | 2002300645 | 10/2002 |
| JP | 2003505931 A | 2/2003 |
| JP | 2007053805 | 3/2007 |
| JP | 2007129542 | 5/2007 |
| WO | 0105100 | 1/2001 |
| WO | 0106714 A1 | 1/2001 |
| WO | 2005025110 A2 | 3/2005 |
| WO | 2007019672 A1 | 2/2007 |

OTHER PUBLICATIONS

English Translation of Japanese Office Action, Application No. 2010-515625, dated Feb. 7, 2012, 3 pages.
Examination Report, European Application No. 08869402.1, dated Feb. 14, 2012, 6 pages.
European Search Report, Application No. 08788883.0-1249, dated Mar. 29, 2012, 8 pages.
Pabst et al., "Relay-Based Deployment Concepts for Wireless and Mobile Broadband Radio", IEEE Communications Magazine, Sep. 2004, p. 80-89, IEEE.
International Search Report, Application No. PCT/IB2008/003562, dated Jul. 28, 2009.
International Search Report, Application No. PCT/IB2008/001827, dated Apr. 6, 2009, p. 1-3.
Zhang et al., "MAC PDU Design for Supporting Data Forwarding Schemes in 802.16j", IEEE 802.16 Broadband Wireless Access Working Group, submitted Jan. 8, 2007, pp. 1-10.
Relay Task Group of IEEE802.16: "Part 16: Air Interface for Fixed and Mobile Broadband Wireless Access Systems", Jun. 6, 2007, XP002608183, retrieved from <http://www.ieeee802.org/16/relay/> on Feb. 13, 2014, pp. 1-191.
U.S. Appl. No. 13/632,366, filed Oct. 1, 2012, Hang Zhang.
European Office Action, Application No. 08869402.1, dated Mar. 21, 2016, 5 pages.
IEEE, "Air Interface for Fixed and Mobile Broadband Wireless Access Systems—Amendment for Physical and Medium Access Control Layers for Combined Fixed and Mobile Operation in Licensed Bands", Aug. 12, 2003, 64 pages.
Office Action for Indian Patent Application No. 33/CHENP/2010, Jul. 21, 2017, pp. 1-6.

* cited by examiner

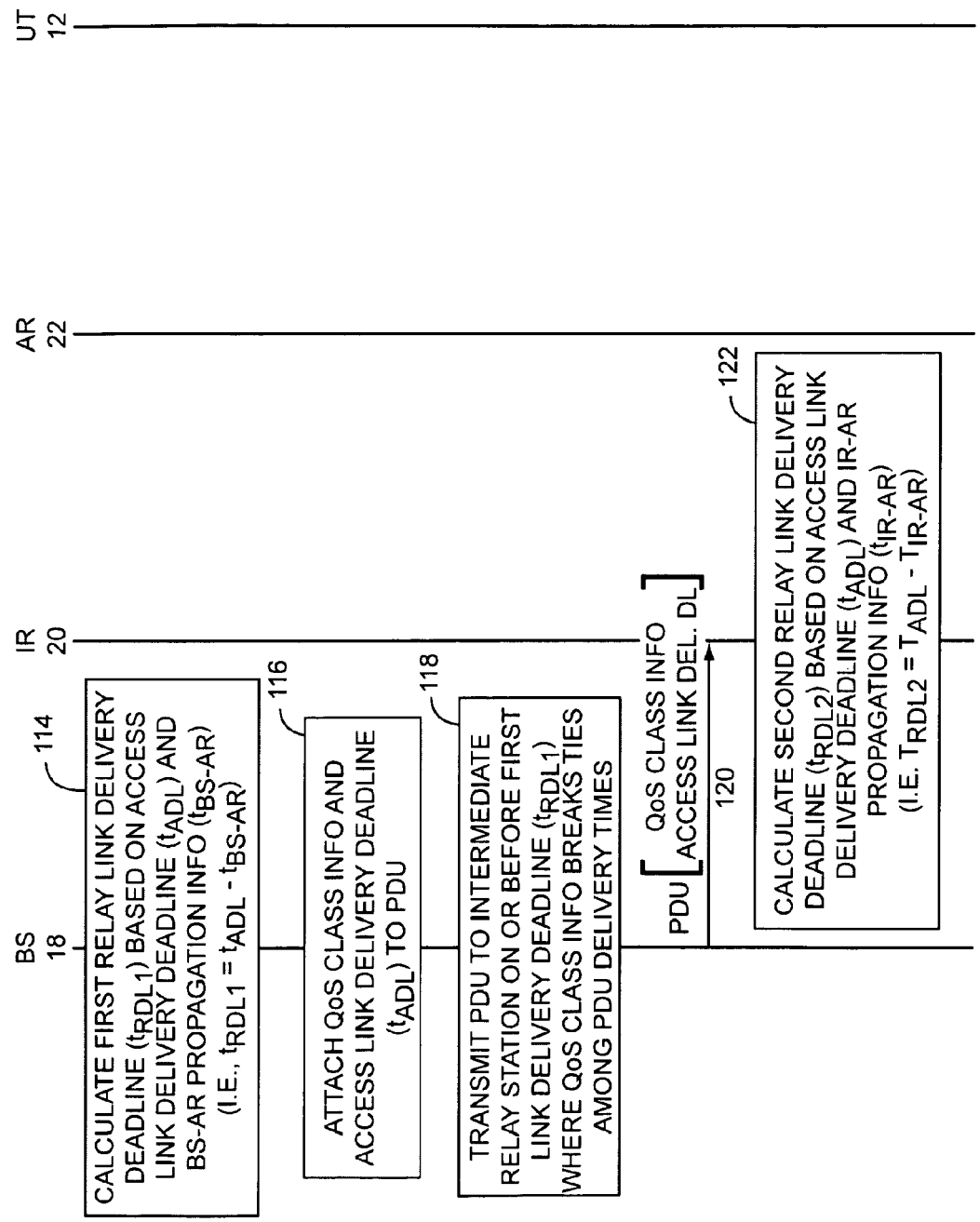

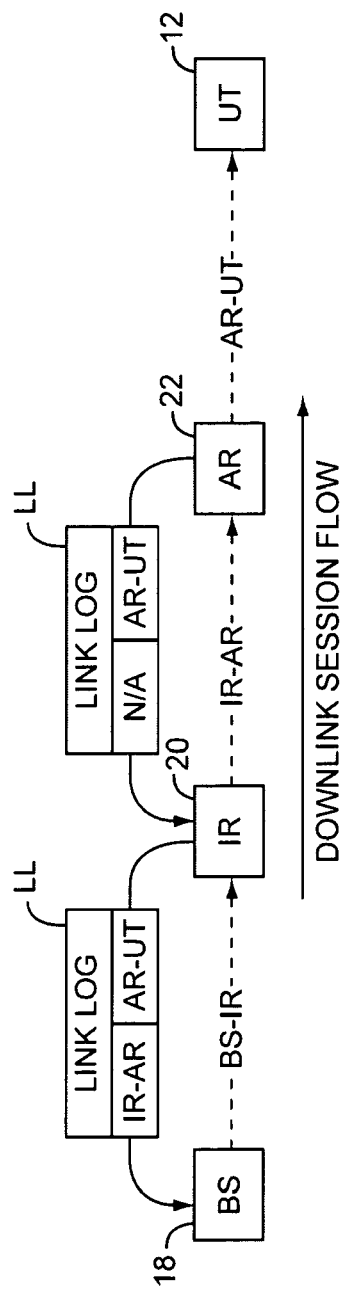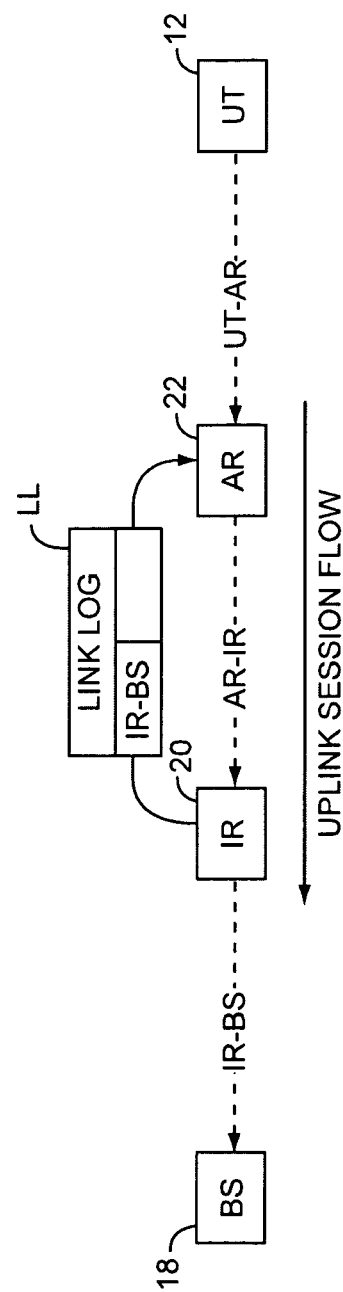
FIG. 4
FIG. 6

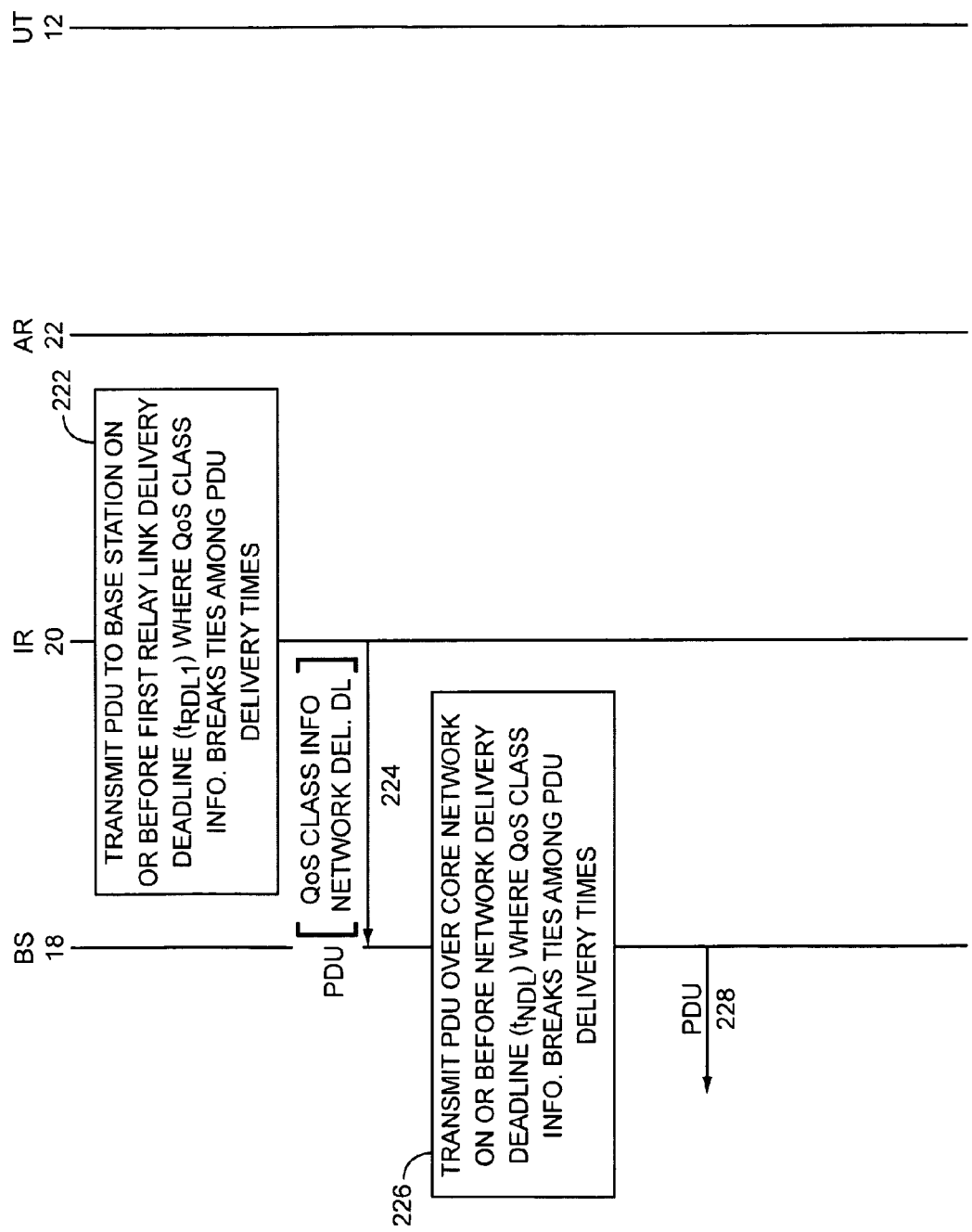

QUALITY OF SERVICE CONTROL IN MULTIPLE HOP WIRELESS COMMUNICATION ENVIRONMENTS

PRIORITY INFORMATION

This application is a continuation application of U.S. patent application Ser. No. 15/149,739, entitled "Quality of Service Control in Multiple Hop Wireless Communication Environments", filed May 9, 2016, which is a continuation of U.S. patent application Ser. No. 14/623,336, entitled "Quality of Service Control in Multiple Hop Wireless Communication Environments", filed Feb. 16, 2015, now issued as U.S. Pat. No. 9,351,200, which is a continuation of U.S. patent application Ser. No. 13/632,366, of the same title, filed Oct. 1, 2012, now issued as U.S. Pat. No. 8,958,300, which is a continuation of U.S. patent application Ser. No. 12/172,899, of the same title, filed Jul. 14, 2008, now issued as U.S. Pat. No. 8,305,897, which claims the benefit of U.S. provisional application Ser. No. 60/949,767 filed Jul. 13, 2007 and U.S. provisional application Ser. No. 61/033,067 filed Mar. 3, 2008, the disclosures of all of which are incorporated herein by reference in their entireties as though fully and completely set forth herein.

RELATED APPLICATIONS

This application is related to U.S. application Ser. No. 12/172,890, entitled "Quality of Service Control in Multiple Hop Wireless Communication Environments", the disclosure of which is incorporated by reference in its entirety as if fully and completely set forth herein.

FIELD OF THE INVENTION

The present invention relates to wireless communications, and in particular to controlling quality of service in multiple hop wireless communication environments.

BACKGROUND OF THE INVENTION

Wireless communications have become ubiquitous in modern society. Cellular networks have matured and now provide extensive coverage for voice communications, and are being increasingly used for data and media applications. However, data rates for cellular networks are relatively low, and thus are limited to those applications that do not require high data rates, such as basic Internet browsing, email, text messaging, and low resolution audio and video streaming. Although such applications are useful, consumers are demanding richer media experiences that require significantly higher data rates, such as those provided by broadband service providers. Broadband access is typically provided by cable and telephone service providers through hard-wired cable, digital subscriber line (DSL), T1, or T3 connections. Wireless access points may be coupled to the hard-wired connections to provide local wireless zones, or hotspots, in which mobile stations with complementary communication capabilities are afforded wireless broadband access.

The Institute for Electrical and Electronics Engineers (IEEE) has set forth a widely used local wireless communication standard, which is referred to as the IEEE 802.11 standard or Wireless Fidelity standard (WiFi). Unfortunately, a WiFi access point has a very limited range of at most 100 to 300 feet, depending on environmental conditions. Given WiFi's limited range, continuous coverage throughout a large geographic area is impractical, if not impossible. As such, mobile users only get the benefit of wireless broadband access when they are within a WiFi hotspot, which is inherently limited in size.

To address the limitations of WiFi and provide continuous broadband access over much larger areas in a fashion analogous to the coverage provided by cellular networks, the IEEE has set forth a next generation wireless communication standard, which is referred to as the IEEE 802.16 standard or wireless metropolitan area network standard (WiMAN). As the IEEE 802.16 standard has evolved, it has been referred to more frequently as the Worldwide Interoperability for Microwave Access standard (WiMAX). WiMAX promises to extend the wireless broadband access provided by a single access point up to 30 miles for fixed stations and three to ten miles for mobile stations.

Given the extended range provided by WiMAX systems, the access points are generally referred to as base stations. Although these base stations provide broadband access over much larger areas, environmental conditions may limit access in certain areas within a given coverage area. For example, geographic elements, such as hills or valleys, may limit access within a coverage area. Buildings or other man-made structures may also affect access throughout a coverage area. Further, access within buildings or mass transit vehicles, such as buses, trains, boats, and the like, may be completely blocked, if not severely limited.

To address these areas of limited access within a coverage area of a base station, one or more relay stations may be employed to effectively extend the reach of the base station. Instead of the base station communicating directly with a mobile station or fixed station of an end user, the relay stations may act as liaisons between these stations and the base station. One or more relay stations may be provided between these stations and a given base station, depending on the needs of the communication environment. The base station and the relay stations use wireless communications to communicate with each other, and the last relay station in the relay path will communicate with the mobile or fixed stations. In addition to addressing dead spots in a given coverage area of a base station, relay stations may also be used to further extend the coverage area of a base station. In most instances, relay stations are less complex and expensive than base stations; therefore, using relay stations to extend the coverage area of a single base station is more economical than installing additional base stations and the infrastructure needed to connect the base stations to a core communication network.

Relay stations may be fixed or mobile. For example, certain relay stations may be permanently affixed to or inside a building, whereas other relay stations may be mounted inside different cars of a subway train. To provide continuous coverage in a coverage area of a given base station, access provided to a mobile station may be transitioned from one relay station to another relay station, from the base station to a relay station, or from the base station to a relay station as the mobile station moves throughout the coverage area of the base station. Access may also be transitioned from one base station to another or from a relay station associated with a first base station to a relay station associated with a second base station as the mobile station moves from one location to another. Similarly, moving relay stations may transition from one base station to another as they move from one location to another.

An issue arising from the use of relay stations is the inability to effectively control quality of service (QoS) for communications that are supported, at least in part, through one or more relay stations. QoS generally relates to metrics, such as delay, jitter, or data loss, that impact the quality of a given communication session or access in general. When a base station communicates directly with a mobile station over an air interface, it is relatively easy for the base station and the mobile station to cooperate with one another to both determine the communication conditions of the air interface and take steps to ensure a given level of QoS is maintained. However, the addition of one or more relay stations in the communication path significantly complicates QoS control, because there are two or more air interfaces between the base station and fixed or mobile stations, which are communicating with the relay stations. To further complicate matters, the conditions of these air interfaces may change dynamically, especially when moving relay stations are involved.

The IEEE 802.16j standard addresses the use of relay stations and the control of communications over the multiple, wireless communication hops between a base station and a fixed or mobile station through one or more relay stations. However, IEEE 80.16j has not yet provided an effective and efficient way to provide QoS controls when relay stations are involved. As such, there is a need for a technique to provide QoS control when relay stations are used in wireless communication environments.

SUMMARY OF THE INVENTION

According to one embodiment of the present invention, one or more relay stations may be employed along a wireless communication access path between a base station and a user terminal. The relay station directly serving the user terminal is an access relay station, and any relay stations between the access relay station and the base station are intermediate relay stations. A logical communication tunnel is established between the base station and the access relay station and through any intermediate relay stations to handle session flows of packet data units (PDUs) for downlink or uplink communications. A single tunnel may handle multiple session flows for the same or different user terminals. For downlink communications, the base station is an ingress station and the access relay station is an egress station of the tunnel. For uplink communications, the access relay station is the ingress station and the base station is the egress station of the tunnel.

Assuming the tunnel extends through at least one intermediate relay station, the ingress station will receive PDUs and schedule the PDUs for delivery to the first intermediate relay station of the tunnel. The PDUs are then delivered as scheduled via the tunnel to the first intermediate relay station in the tunnel. If the tunnel extends through multiple intermediate relay stations, the first intermediate relay station will receive the PDUs and schedule the PDUs for delivery to the next intermediate relay station of the tunnel. The PDUs are then delivered as scheduled via the tunnel to the next intermediate relay station. The last intermediate relay station in the tunnel will receive the PDUs and schedule the PDUs for delivery to the egress station of the tunnel. The PDUs are then delivered as scheduled via the tunnel to the egress station. If the egress station is an access relay station, the PDUs are scheduled for delivery to the appropriate user terminals and then delivered as scheduled via the corresponding access connections. If the egress station is a base station, the PDUs are scheduled for delivery over the core network and then delivered as scheduled.

As noted, the ingress station, egress station, and any intermediate relay stations may schedule the PDUs for delivery at different hops in the wireless communication path. This scheduling is preferably done to maintain appropriate QoS levels for the various session flows. However, the presence of the tunnel makes it difficult for the intermediate relay stations, and in certain cases the egress stations, to properly schedule delivery of the PDUs, because these nodes do not have access to any scheduling or QoS related information for the PDUs. In one embodiment of the present invention, the ingress station may add scheduling information to the PDUs before they are delivered to the intermediate relay stations or egress stations. The scheduling information is used by the intermediate relay stations to schedule the PDUs for delivery to the next intermediate relay station or the egress station, as the case may be. The scheduling information may also be used by the egress station to schedule the PDUs for delivery to the corresponding user terminals. The ingress station may add the scheduling information to one or more headers or sub-headers of the PDU or in the body of each PDU. The PDUs may be media access control (MAC) or other protocol level PDUs. In one embodiment, the scheduling information added to the PDU by the ingress station bears on a QoS class associated with the PDU, a deadline for the egress station to deliver the PDU to the corresponding user terminals, or a combination thereof.

In one embodiment, when a PDU arrives, the ingress station will determine the arrival time for a PDU and determine a deadline for the egress station to deliver the PDU to the user terminal for the downlink, or over the core network for the uplink, based on QoS information for the PDU. The QoS information may relate to the maximum latency, or delay, allowed for the PDU to reach the egress station. Based on the arrival time and the QoS information, the ingress station will calculate the deadline for the egress station to deliver the PDU to the user terminal. Next, the ingress station will determine how long it will take the PDU to reach the egress station through the tunnel and schedule the PDU for delivery to the first intermediate relay station in a manner ensuring that the PDU will reach the egress station prior to the deadline for the egress station to deliver the PDU to the user terminal for the downlink, or over the core network for the uplink.

As noted, the ingress station may add the QoS class information, a deadline for the egress station to deliver the PDU, or both to the PDU prior to delivering it to the first intermediate relay station. Upon receiving the PDU from the ingress station, the intermediate relay station may access any available QoS information or deadline information provided in the PDU. The first intermediate relay station may then determine how long it will take the PDU to reach the egress station through the remaining portion of the tunnel and schedule the PDU for delivery to the next intermediate relay station or the egress station, as the case may be, in a manner ensuring that the PDU will reach the egress station prior to the deadline for the egress station to deliver the PDU to the user terminal for the downlink, or over the core network for the uplink. The PDU may be processed in the same manner by each intermediate relay station until the PDU reaches the egress station. The egress station may use the delay information in the PDU for scheduling the PDU for delivery to the user terminal. The egress station will deliver the PDU to the user terminal prior to the deadline for the egress station to deliver the PDU to the user terminal for the downlink, or over the core network for the uplink. Notably, the QoS class information may be used to break scheduling ties where multiple PDUs are scheduled for delivery by an ingress station, intermediate relay station, or egress station at the same time. Preferably, the PDUs associated with a higher class of service are delivered before those with a lower class of service. Further, the scheduling or delivery deadlines may be based on a particular frame or time.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 3A:
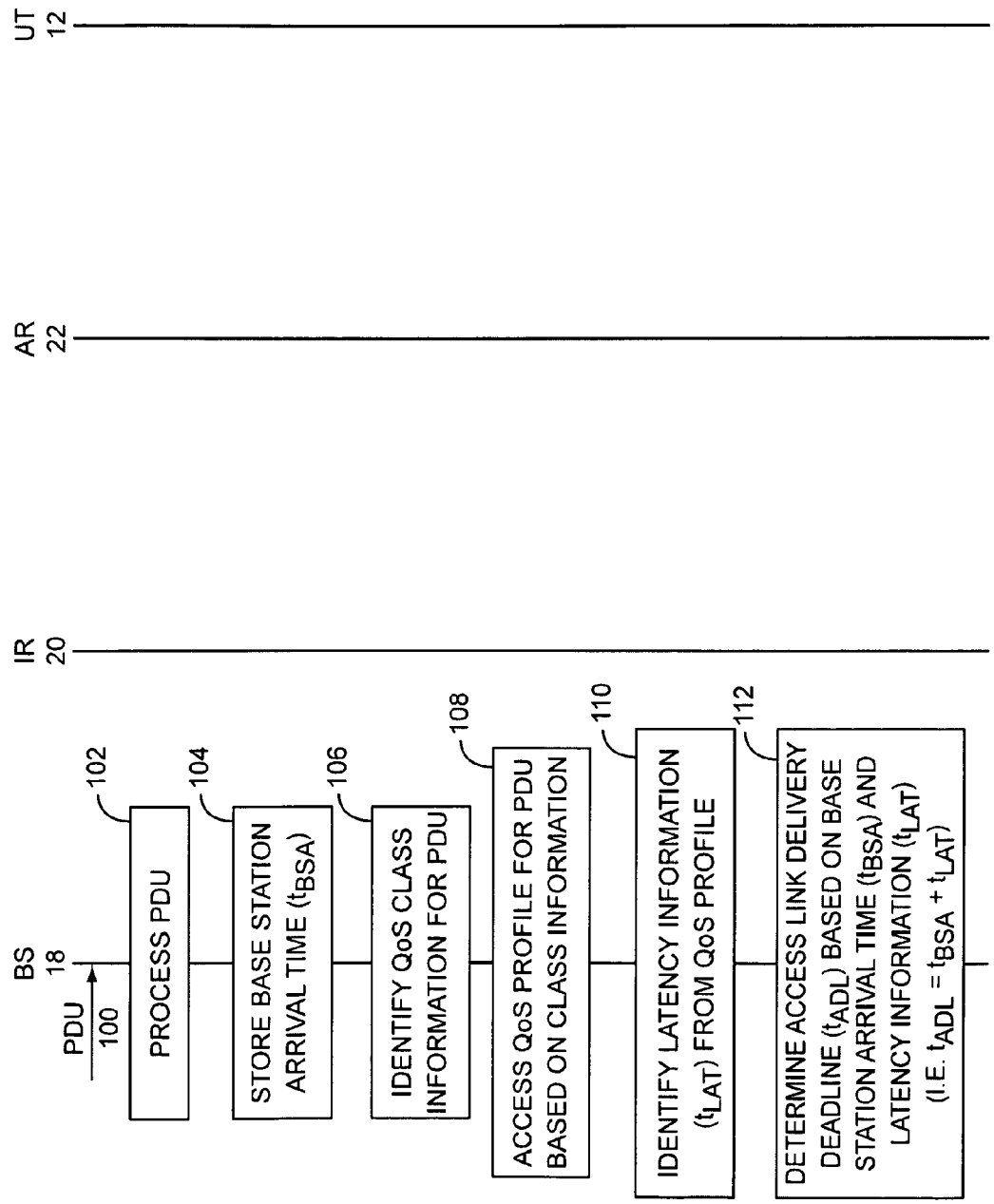
Figure 3C:
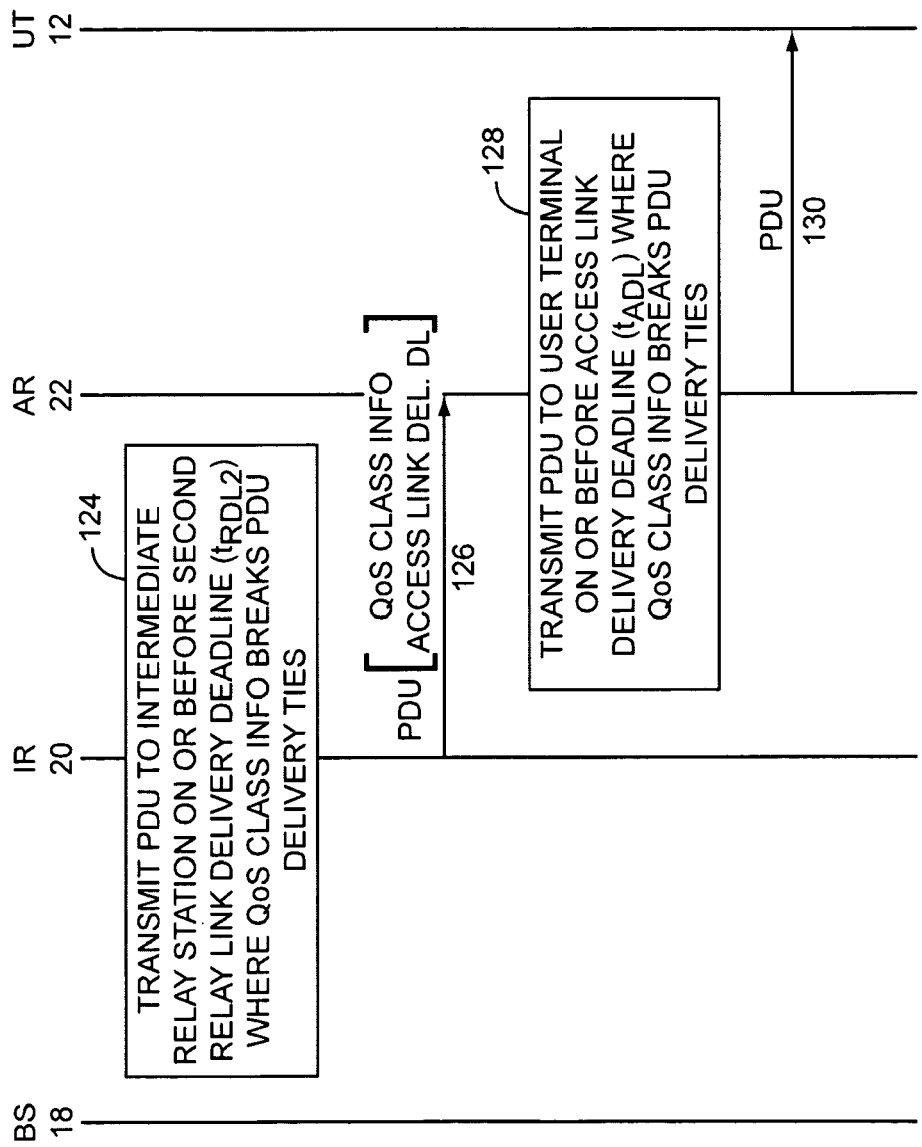

FIGS. 3A-3C provide a communication flow for downlink communications according to one embodiment of the present invention.

FIG. 4 is a block representation illustrating the use of a link log in association with downlink communications according to one embodiment of the present invention.

Figure 5A:
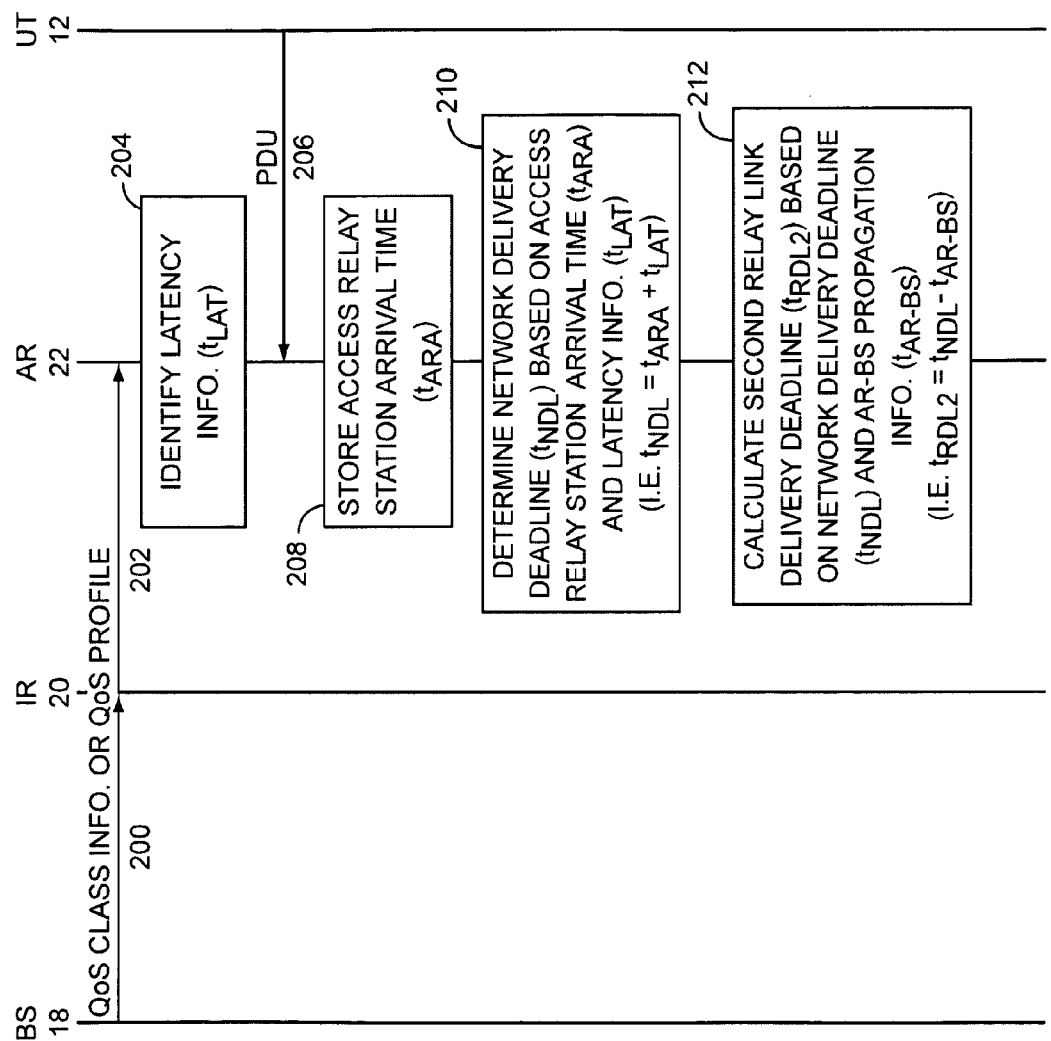
Figure 5B:
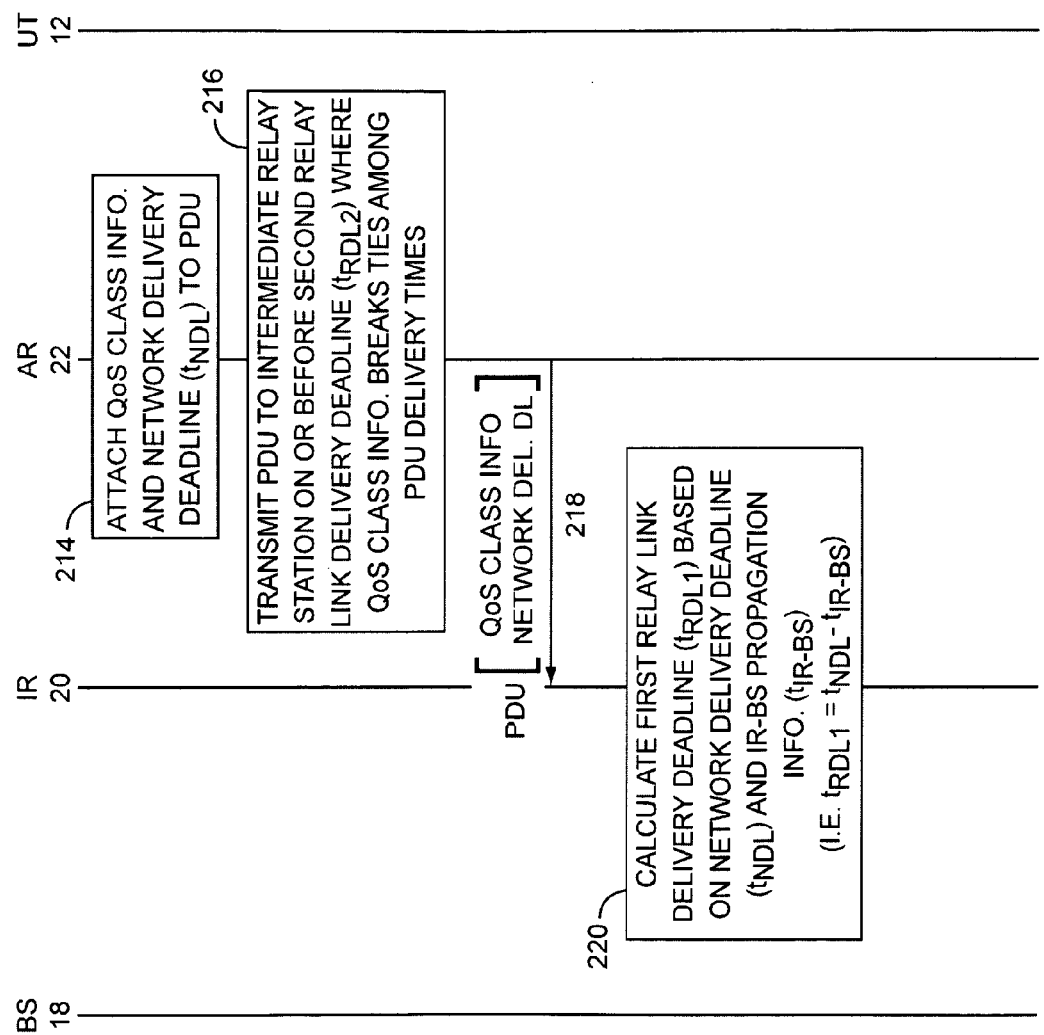

FIGS. 5A-5C provide a communication flow for uplink communications according to one embodiment of the present invention.

FIG. 6 is a block representation illustrating the use of a link log in association with uplink communications according to one embodiment of the present invention.

Figure 7:
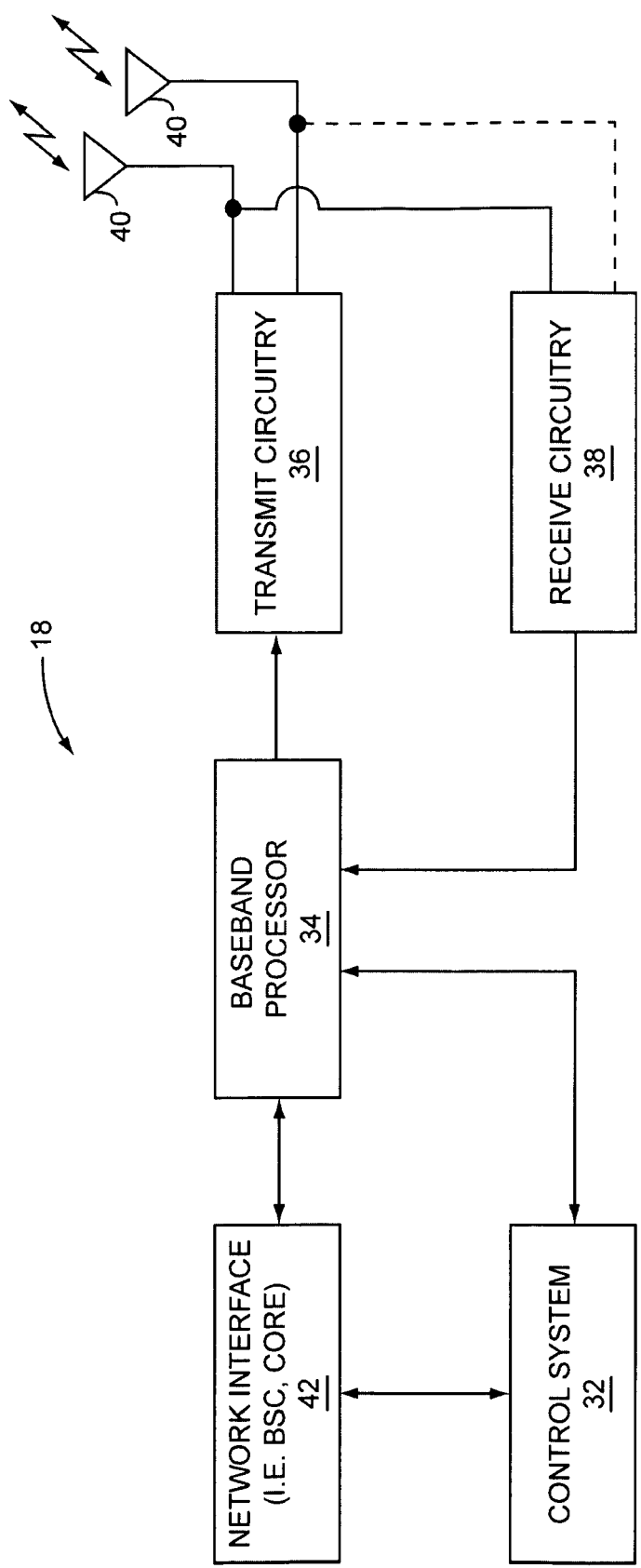

FIG. 7 is a block representation of a base station according to one embodiment of the present invention.

Figure 8:
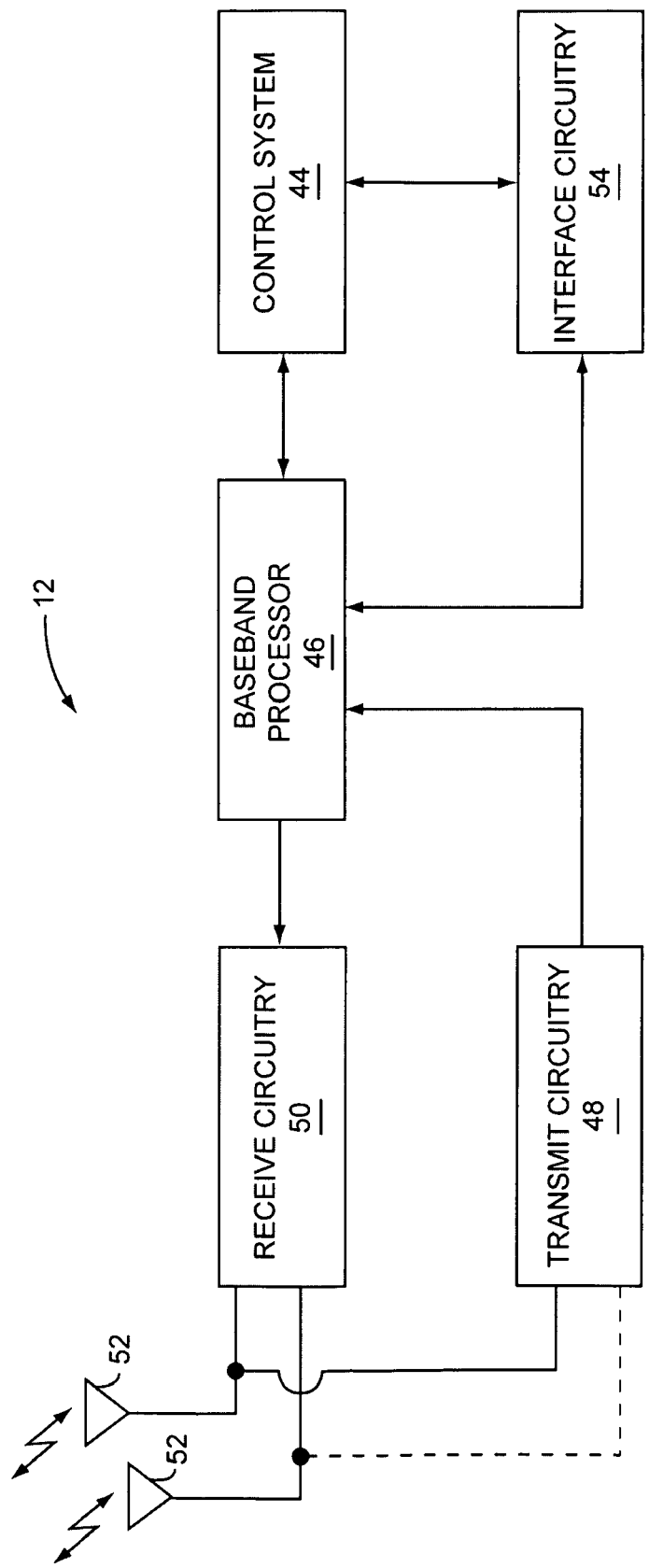

FIG. 8 is a block representation of a user terminal according to one embodiment of the present invention.

Figure 9:
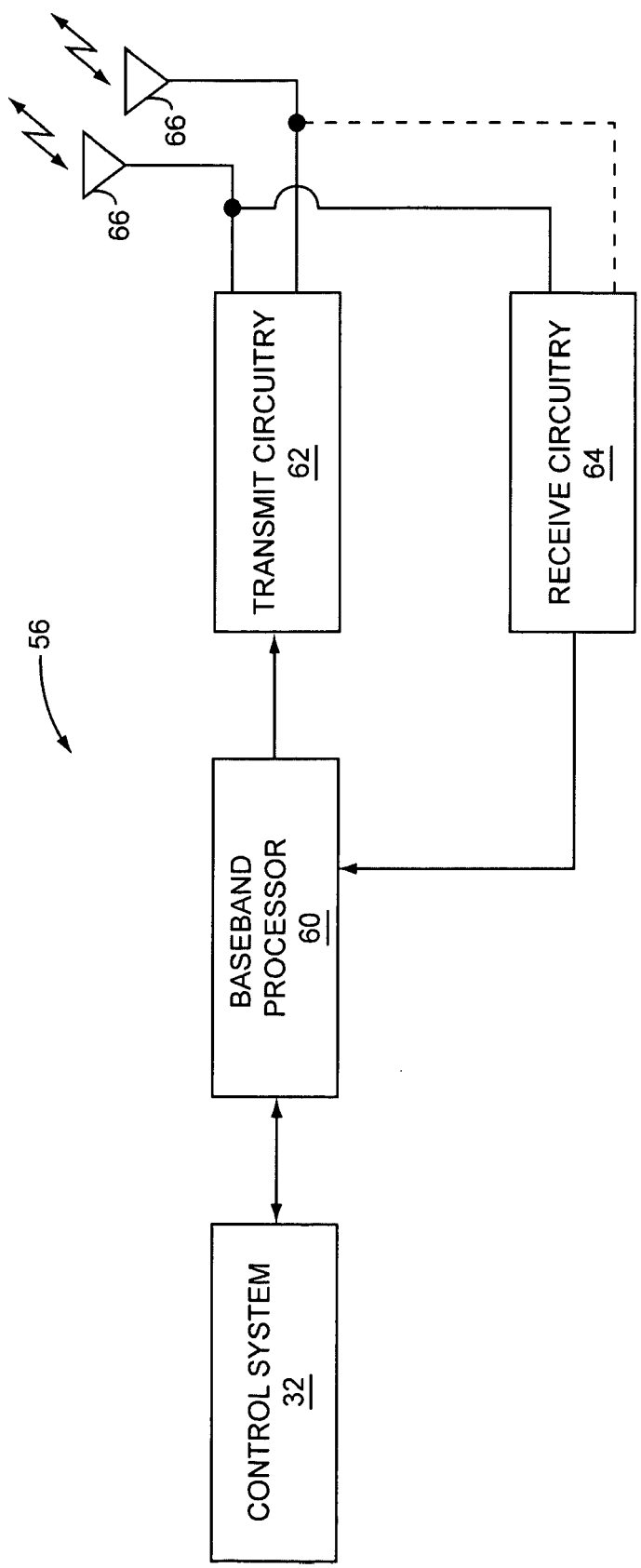

FIG. 9 is a block representation of a relay station, such as an access relay station or intermediate relay station, according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
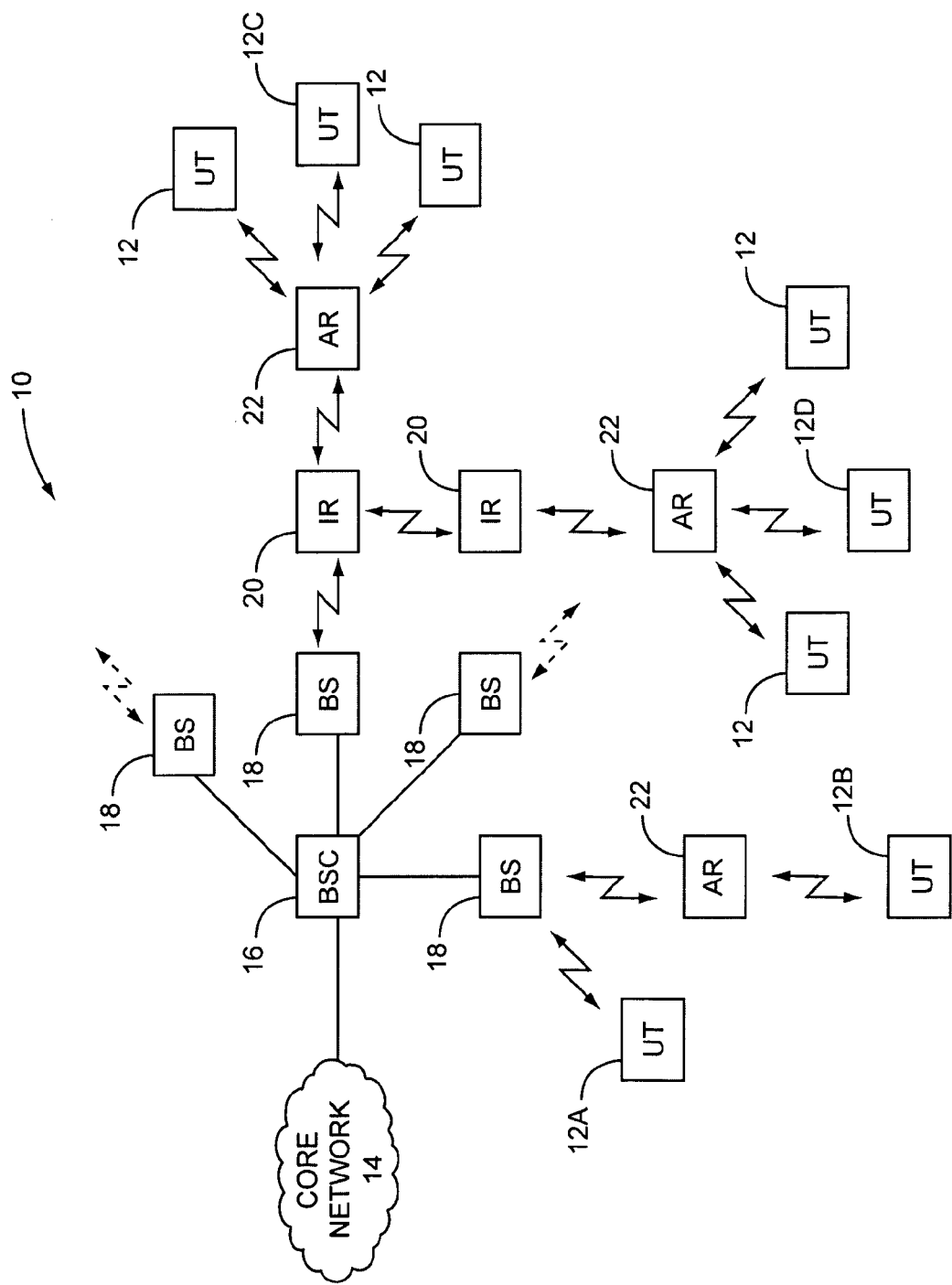
FIG. 1 is a communication environment according to one embodiment of the present invention.

With reference to FIG. 1, a wireless communication environment 10 is illustrated according to one embodiment of the present invention. As depicted, various user terminals (UT) 12 may communicate over a core network 14 through a corresponding base station controller (BSC) 16, base station (BS) 18, and one or more relay stations. Depending on the location and function of the relay stations, the relay stations may be considered intermediate relay stations (IR) 20 or access relay stations (AR) 22. The user terminals 12 may represent mobile or fixed terminals that are capable of supporting wireless communications with one or more of the base stations 18 and access relay stations 22. The intermediate relay stations 20 and access relay stations 22 also support wireless communications. In particular, the access relay stations 22 will support wireless communications with the user terminals 12 as well as with intermediate relay stations 20 or base stations 18. One or more intermediate relay stations 20 will reside between a base station 18 and an access relay station 22, and will facilitate wireless communications with the base station 18, with the access relay station 22, or both.

Accordingly, a user terminal 12 may communicate directly with a base station 18 or an access relay station 22. As illustrated, user terminal 12A is served directly by a base station 18. User terminals 12B, 12C, and 12D are served by different access relay stations 22. The access relay station 22 that serves user terminal 12B is directly served by a base station 18. User terminal 12C is served by an access relay station 22 that is linked to a base station 18 through a single intermediate relay station 20. User terminal 12D is served by an access relay station 22 that is coupled to a base station 18 through two intermediate relay stations 20. As such, user terminals 12 may be served by base stations 18 or access relay stations 22, and any number of intermediate relay stations 20 may be provided to wirelessly connect a base station 18 with a given access relay station 22.

Preferably, the user terminals 12 are able to move about the communication environment 10, and thus be served by different access relay stations 22 and base stations 18, depending on their location. Further, the access relay stations 22 may be mobile or fixed. Accordingly, the access relay stations 22 may transition from being served directly by one base station 18 to another base station 18, or an intermediate relay station 20. Mobile access relay stations 22 may also transition from one intermediate relay station 20 to another.

Communications between the base stations 18, intermediate relay stations 20, access relay stations 22, and the user terminals 12 are provided via wireless communication links. Each communication link is considered a "hop." When a user terminal 12, such as user terminal 12A, is served directly by a base station 18, the access path is considered to be a single-hop wireless communication path. When one or more relay stations reside in the access path, the access path is considered a multi-hop wireless communication path. Accordingly, the access path between user terminal 12B and its serving base station 18 is a dual-hop wireless communication path. The access path between user terminal 12C and its serving base station 18 is considered a three-hop wireless communication path, while the access path between user terminal 12D and its serving base station 18 is considered a four-hop wireless communication path.

For single-hop wireless communication paths, the user terminals 12 and base stations 18 can communicate with each other and determine the channel conditions or other factors that may impact the exchange of data between the two entities. When dealing with only a single wireless communication link, the base station 18 can relatively easily determine the channel conditions associated with the wireless communication link and schedule downlink communications to the user terminal 12 and uplink communications from the user terminal 12 to ensure appropriate quality of service (QoS) levels are maintained. However, when relay stations are employed, multiple hops, and thus multiple wireless communication links, reside between the base station 18 and the corresponding user terminal 12. While the base station 18 may be able to derive an indication of the channel conditions between it and the relay station with which it directly communicates, the channel conditions for wireless communication links between the relay station and the user terminal 12 or other relay stations is not directly accessible by the base station 18. Given the ability for certain relay stations and user terminals 12 to move, these channel conditions may change dynamically and continuously. As such, scheduling uplink and downlink transmissions in a manner ensuring certain QoS levels are maintained has proven to be challenging.

In many situations, different user terminals 12 may require different QoS levels. Further, different types of communications may be associated with different QoS levels. For example, different subscribers may pay different rates for different overall QoS levels. Further, certain media applications, such as streaming audio and video as well as voice, may require higher QoS levels than certain web browsing or file transfer applications. For the most part, the part of the communication path that is most likely to change is the wireless access portion residing between the base station 18 and the user terminal 12, either directly or through one or more relay stations. Accordingly, the present invention employs techniques to take into consideration the impact of the various wireless communication links along the wireless access path, in light of QoS requirements, to control the scheduling of uplink and downlink communications.

Figure 2:
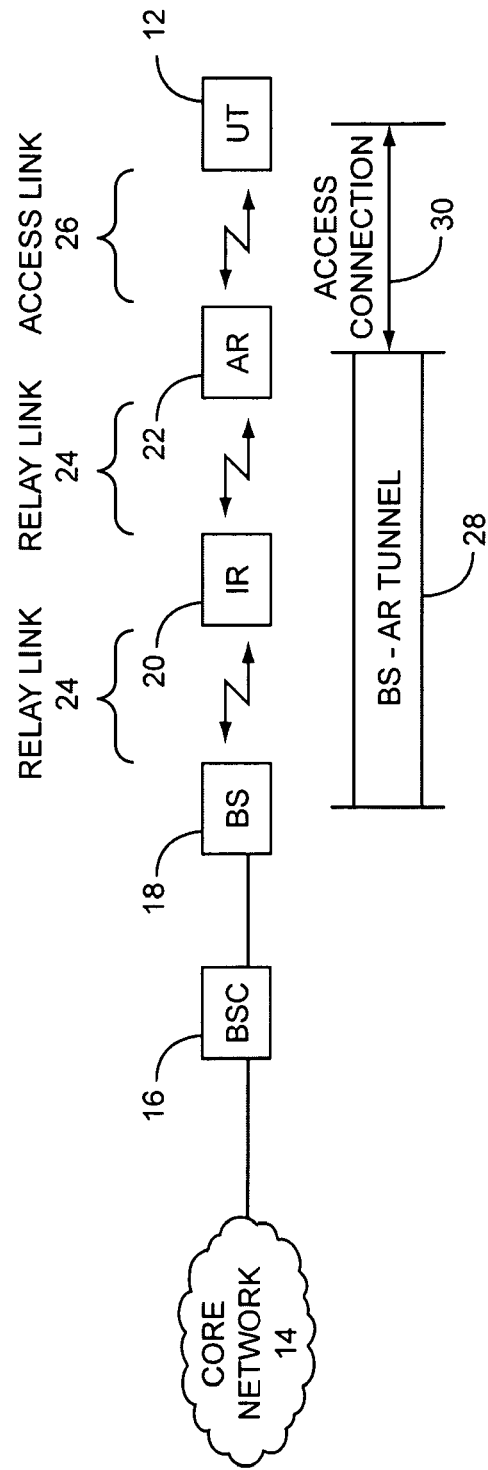
FIG. 2 is a block representation of a wireless communication path according to one embodiment of the present invention.

With reference to FIG. 2, one or more relay stations may be employed along a wireless communication access path between the base station 18 and the user terminal 12. Wireless relay links 24 are provided between the base station 18 and the intermediate relay station 20 as well as between the intermediate relay station 20 and the access relay station 22. A wireless access link 26 provided between the access relay station 22 and the user terminal 12. If multiple intermediate relay stations 20 are provided in the wireless communication access path, relay links 24 are also established between the intermediate relay stations 20. As noted, the relay station directly serving the user terminal 12 is an access relay station 22, and any relay stations between the access relay station 22 and the base station 18 are intermediate relay stations 20. A logical communication tunnel is established between the base station 18 and the access relay station 22 and through one or more intermediate relay stations 20 to handle session flows of PDUs for downlink or uplink communications. This tunnel is referred to as a BS-AR tunnel 28, and different tunnels may be used for uplink and downlink communications. The BS-AR tunnel 28 may handle multiple session flows for the same or different user terminals 12. For downlink communications, the base station 18 is an ingress station and the access relay station 22 is an egress station of the BS-AR tunnel 28. For uplink communications, the access relay station 22 is the ingress station and the base station 18 is the egress station of a BS-AR tunnel 28.

Assuming the BS-AR tunnel 28 extends through at least one intermediate relay station 20 as depicted, the ingress station will receive PDUs and schedule the PDUs for delivery to the first intermediate relay station 20 of the tunnel. The PDUs are then delivered as scheduled via the BS-AR tunnel 28 to the first intermediate relay station 20 in the BS-AR tunnel 28. If the BS-AR tunnel 28 extends through multiple intermediate relay stations 20 (not shown in FIG. 2), the first intermediate relay station 20 will receive the PDUs and schedule the PDUs for delivery to the next intermediate relay station 20 of the BS-AR tunnel 28. The PDUs are then delivered as scheduled via the tunnel to the next intermediate relay station 20. The last intermediate relay station 20 in the BS-AR tunnel 28 will receive the PDUs and schedule the PDUs for delivery to the egress station. The PDUs are then delivered as scheduled via the BS-AR tunnel 28 to the egress station. If the egress station is an access relay station 22, the PDUs are scheduled for delivery to the appropriate user terminals 12 and then delivered as scheduled via the corresponding access connection 30, which is provided via the access link 26. If the egress station is a base station 18, the PDUs are scheduled for delivery over the core network 14 and then delivered as scheduled.

As noted, the ingress station, egress station, and any intermediate relay stations 20 may schedule the PDUs for delivery at different hops in the wireless communication path. This scheduling is preferably done to maintain appropriate QoS levels for the various session flows. However, the presence of the BS-AR tunnel 28 makes it difficult for the intermediate relay stations 20, and in certain cases the egress stations, to properly schedule delivery of the PDUs because these nodes do not normally have access to any scheduling or QoS related information for the PDUs. In one embodiment of the present invention, the ingress station may add scheduling information to the PDUs before they are delivered to the intermediate relay stations 20 or egress station. The scheduling information is used by the intermediate relay stations 20 to schedule the PDUs for delivery to the next intermediate relay station 20 or the egress station, as the case may be. The scheduling information may also be used by the egress station to schedule the PDUs for delivery to the corresponding user terminals 12. The ingress station may add the scheduling information to a header or in the body of each PDU. In one embodiment, the scheduling information added to the PDU by the ingress station bears on a QoS class associated with the PDU, a deadline for the egress station to deliver the PDU to the corresponding user terminals 12 for the downlink, or over the core network 14 for the uplink, or a combination thereof.

When a PDU arrives, the ingress station will determine the arrival time for a PDU and determine a deadline for the egress station to deliver the PDU to the user terminal 12 for the downlink, or over the core network 14 for the uplink, based on QoS information for the PDU. The QoS information may relate to the maximum latency, or delay, allowed for the PDU to reach the egress station. Based on the arrival time and the QoS information, the ingress station will calculate the deadline for the egress station to deliver the PDU to the user terminal 12 for the downlink, or over the core network 14 for the uplink. Next, the ingress station will determine how long it will take the PDU to reach the egress station through the tunnel and schedule the PDU for delivery to the first intermediate relay station 20 in a manner ensuring that the PDU will reach the egress station prior to the deadline for the egress station to deliver the PDU to the user terminal 12 for the downlink, or over the core network 14 for the downlink.

As noted, the ingress station may add the QoS class information, a deadline for the egress station to deliver the PDU to the user terminal 12 for the downlink or over the core network 14 for the uplink, or both, to the PDU prior to delivering it to the first (and only illustrated) intermediate relay station 20. Upon receiving the PDU from the ingress station, the first intermediate relay station 20 may access any available QoS information or deadline information provided in the PDU. The first intermediate relay station 20 may then determine how long it will take the PDU to reach the egress station through the remaining portion of the tunnel and schedule the PDU for delivery to the next intermediate relay station 20 (not illustrated) or the egress station (as illustrated), as the case may be, in a manner ensuring that the PDU will reach the egress station prior to the deadline for the egress station to deliver the PDU to the user terminal 12 for the downlink, or over the core network 14 for the uplink. The PDU may be processed in the same manner by each intermediate relay station 20 until the PDU reaches the egress station. The egress station may use the delay information in the PDU for scheduling the PDU for delivery to the user terminal 12 for the downlink or over the core network 14 for the uplink. The egress station will deliver the PDU prior to the deadline for the egress station to the deliver the PDU to the user terminal 12 for the downlink, or over the core network 14 for the uplink. Notably, the QoS class information may be used to break scheduling ties where multiple PDUs are scheduled for delivery by an ingress station, intermediate relay station 20, or egress station at the same time. Preferably, the PDUs associated with a higher class of service are delivered before those with a lower class of service. Further, the scheduling or delivery deadlines may be based on a particular frame or time.

With reference to FIGS. 3A-3C, a communication flow is provided according to one embodiment of the present invention to illustrate an exemplary scheduling process for downlink communications. In this example, assume the wireless communication access path is the same or similar to that illustrated in FIG. 2. The communication flow illustrates the handling of a given PDU that is received from the core network 14 through the base station controller 16. Initially, an incoming PDU is received and then processed by the base station 18 (steps 100 and 102). The base station 18 will note the time at which the PDU arrives at the base station 18, and will store information related to the arrival time as the base station arrival time ($t_{BSA}$) (step 104).

As indicated, the PDU is one of a number of PDUs that make up a session flow for a given communication session. A service flow may be assigned to one of any number of defined QoS classes. Each class will be associated with various QoS parameters that should control how PDUs for the given session flow are handled for uplink or downlink communications. The QoS parameters are maintained in a QoS profile for the particular QoS class. In one embodiment, the QoS parameters provided in the QoS class define latency information, which relates to the maximum delay between the base station arrival time $t_{BSA}$ and an access link delivery deadline ($t_{ADL}$), which corresponds to a time at or before which the PDU should be transmitted directly to the user terminal 12 over the access link 26.

Notably, when a session flow is established, a service node in the core network 14 will assign a QoS class for the service flow. The service node may provide the base station 18 with class identification information for the service flow, wherein the base station 18 will be able to analyze information provided in a PDU and identify the QoS class for the service flow to which the PDU belongs. When the service flow is being established, the base station 18 may access the corresponding QoS profile for the corresponding QoS class identification information. Thus, the base station 18 may gather information from the PDU to determine the service flow to which the PDU belongs, and then determine the QoS class for the service flow. Alternatively, the PDU may include information related to the appropriate QoS class, and the base station 18 may identify the appropriate QoS class based on the information provided in the PDU itself.

Regardless of the technique, the base station 18 will identify QoS class information for the PDU (step 106) and access the QoS profile for the PDU based on the class information (step 108). From the QoS profile, the base station 18 may obtain the latency information ($t_{LAT}$) from the QoS profile (step 110). Based on the base station arrival time ($t_{BSA}$) and the latency information ($t_{LAT}$), the base station 18 may determine an access link delivery deadline ($t_{ADL}$) (step 112). The access link delivery deadline $t_{ADL}$ corresponds to the latest time or frame at which the PDU can be delivered to the user terminal 12 from the access relay station 22. If the latency information $t_{LAT}$ corresponds to maximum allowable time from which the PDU arrived at the base station 18 and the time from which the PDU should be transmitted from the access relay station 22, the access link delivery deadline $t_{ADL}$ can be calculated by adding the latency information $t_{LAT}$ to the base station arrival time $t_{BSA}$, wherein $t_{ADL}=t_{BSA}+t_{LAT}$.

At this point, the base station 18 is aware of the latest time or frame at which the PDU should be transmitted from the access relay station 22. However, there are two relay links 24 that reside between the base station 18 and the access relay station 22. Accordingly, in order for the base station 18 to ensure that the PDU arrives at the access relay station 22 in time to be transmitted to the user terminal 12 by the access link delivery deadline $t_{ADL}$, the base station 18 needs to ensure that the PDU is transmitted to the intermediate relay station 20 in sufficient time to allow the intermediate relay station 20 to deliver the PDU to the access relay station 22 prior to the access link delivery deadline $t_{ADL}$. Accordingly, the base station 18 will calculate a first relay link delivery deadline ($t_{RDL1}$) based on the access link delivery deadline $T_{ADL}$ and BS-AR propagation information ($t_{BS-AR}$) (step 114). The first relay link delivery deadline $t_{RDL1}$ corresponds to the last time or frame at which the PDU can be transmitted to the intermediate relay station 20 by the base station 18 and still maintain the desired QoS level. The BS-AR propagation information $t_{BS-AR}$ corresponds to a time it takes for a PDU that is transmitted from the base station 18 to propagate to the access relay station 22 through the relay links 24 and the intermediate relay station 20. Accordingly, the BS-AR propagation information $t_{BS-AR}$ corresponds to the time it takes a PDU to pass through the BS-AR tunnel 28, which extends between the base station 18 and the access relay station 22. In this example, the first relay link delivery deadline $t_{RDL1}$ may be determined by subtracting the BS-AR propagation information $t_{BS-AR}$ from the access link delivery deadline $t_{ADL}$, wherein $t_{RDL1}=t_{ADL}-t_{BS-AR}$.

At this point, the base station 18 knows the last time or frame at which the PDU can be transmitted to the intermediate relay station 20 and still meet QoS requirements. Since the base station 18 will be handling multiple PDUs for multiple session flows, the base station 18 will be providing these steps for each PDU and determining when to transmit the various PDUs toward the various intermediate relay stations 20, access relay stations 22, or user terminals 12, depending on the number of hops in the wireless communication path. In one embodiment, each PDU is scheduled to be transmitted at a particular time or in a particular frame based on the first relay link delivery deadline $t_{RDL1}$.

Prior to transmission of the PDU to the intermediate relay station 20, the base station 18 will attach QoS class information and the access link delivery deadline $t_{ADL}$ to the PDU in one or more headers or sub-headers or in the actual body of the information being carried in the PDU (step 116). In a preferred embodiment, the QoS class information and access link delivery deadline is provided in the same or different sub-headers in a media access control (MAC) PDU. By providing the QoS class information and the access link delivery deadline $t_{ADL}$ in the PDU, the intermediate relay station 20 is able to identify the QoS class associated with the PDU and use the access link delivery deadline $t_{ADL}$ to determine when the PDU should be transmitted to the access relay station 22 in order to maintain the desired level of QoS. Accordingly, the base station 18 will transmit the PDU to the intermediate relay station 20 on or before the first link delivery deadline $t_{RDL1}$ (step 118). Notably, if multiple PDUs for different session flows have the same first link delivery deadline $t_{RDL1}$, the base station 18 may use the QoS class information to break ties among the PDU delivery times. Those PDUs associated with a higher QoS class will be transmitted to the appropriate intermediate relay station 20 (or other appropriate relay station or user terminal) before PDUs associated with a lower QoS class.

Next, the intermediate relay station 20 will receive the PDU, which includes the QoS class information as well as the access link delivery deadline $t_{ADL}$ (step 120). The intermediate relay station 20 will then calculate a second relay link delivery deadline ($t_{RDL2}$) based on the access link delivery deadline $t_{ADL}$ and IR-AR propagation information ($t_{IR-AR}$) (step 122). The second relay link delivery deadline $t_{RDL2}$ corresponds to the latest time or frame at which the PDU should be transmitted to the access relay station 22 in order to maintain the required QoS level. For instance, the second relay link delivery deadline $t_{RDL2}$ may be calculated by subtracting the IR-AR propagation information $t_{IR-AR}$ from the access link delivery deadline $t_{ADL}$, wherein: $t_{RDL2} = t_{ADL} - t_{IR-AR}$.

The intermediate relay station will then transmit the PDU to the access relay station 22 on or before the second relay link delivery deadline $t_{RDL2}$ (step 124). Again, the QoS class information for the various PDUs may be used to break ties for PDUs that have the same relay link delivery deadline. Notably, the PDU will be delivered to the access relay station 22 with the QoS class information as well as the access link delivery deadline $t_{ADL}$ (step 126). The access relay station 22 will transmit the PDU to the user terminal 12 on or before the access link delivery deadline $t_{ADL}$ (step 128). The access relay station 22 may break ties for PDUs that have the same access link delivery deadlines based on the QoS class associated with the respective PDUs. The PDU may be delivered to the user terminal 12 over the access link 26 and the appropriate access connection 30, with or without the QoS class information or the access link delivery deadline (step 130).

As noted above, the BS-AR propagation information, $t_{BS-AR}$, bears on the amount of time a PDU takes to travel to the access relay station 22 from the base station 18; however, it does not have to be measured in units of time. For scheduling delivery of the PDU to the intermediate relay station 20, the base station 18 uses the BS-AR propagation information, $t_{BS-AR}$, to calculate the first relay link delivery deadline. The BS-AR propagation information, $t_{BS-AR}$, may be determined in a variety of ways using different types of information. For example, each hop between the base station 18 and the access relay station 22 may be associated with a normalized delivery time, $t_{norm}$ and the BS-AR propagation information, $t_{BS-AR}$, may simply be based on the number of hops, n, between the base station 18 and the access relay station 22 in light of the normalized delivery time, $t_{norm}$ for the various hops. Accordingly, the BS-AR propagation information, $t_{BS-AR}$, may be determined as follows:

$$t_{BS-AR} = n \cdot t_{norm}. \quad \text{Eq. 1}$$

If actual or average delivery times are available for each hop, the BS-AR propagation information $t_{BS-AR}$, may be based on these delivery times. Using the example above, the BS-AR propagation information $t_{BS-AR}$ may be determined as follows:

$$t_{BS-AR} = t_{hop1} + t_{hop2}, \quad \text{Eq. 2}$$

where $t_{hop1}$ represents the actual or average delivery time for PDUs being delivered from the base station 18 to the intermediate relay station 20 and $t_{hop2}$ represents the actual or average delivery time for PDUs being delivered from the intermediate relay station 20 to the access relay station 22.

Similarly, the IR-AR propagation information, $t_{IR-AR}$, bears on the amount of time it should take a PDU to travel to the access relay station 22 from the intermediate relay station 20. For scheduling delivery of the PDU to the access relay station 22, the intermediate relay station 20 uses the IR-AR propagation information $t_{IR-AR}$ to calculate the second relay link delivery deadline $t_{RDL2}$. The IR-AR propagation information $t_{IR-AR}$ may be determined in a similar fashion as the BS-AR propagation information $t_{BS-AR}$. For example, each remaining hop between the intermediate relay station 20 and the access relay station 22 may be associated with a normalized delivery time $t_{norm}$ and the BS-AR propagation information $t_{BS-AR}$ may simply be based on the number of remaining hops, m, between the base station 18 and the access relay station 22 in light of the normalized delivery time $t_{norm}$ for the remaining hops. Accordingly, the BS-AR propagation information $t_{BS-AR}$ may be determined as follows:

$$t_{BS-AR} = m \cdot t_{norm}. \quad \text{Eq. 3}$$

If actual or average delivery times are available for the remaining hop (or hops), the IR-AR propagation information $t_{IR-AR}$ may be based on these delivery times. Using the example above, the IR-AR propagation information $t_{IR-AR}$, may be determined as follows:

$$T_{IR-AR} = t_{hop2}, \quad \text{Eq. 4}$$

where $t_{hop2}$ again represents the actual or average delivery time for PDUs being delivered from the intermediate relay station 20 to the access relay station 22.

The BS-AR and IR-AR propagation information may be obtained by the base station 18 or the intermediate relay station 20 in a variety of ways. For normalized information, the respective stations may have access to the number of hops to the access relay station 22 and use standardized hop times for the corresponding calculations. In more complex embodiments, link performance information based on actual or average hop times may be exchanged between the various stations. For example, the access relay station 22 may monitor access link metrics for the access link 26 and report the access link metrics to the intermediate relay station 20. The intermediate relay station 20 may monitor relay link metrics for the relay link 24, which resides between the intermediate relay station 20 and the access relay station 22. Based on the relay link metrics, the intermediate relay station 20 can determine a hop time for the relay link 24, which resides between the access relay station 22 and the intermediate relay station 20. As such, the relay link metrics for the relay link 24 between the intermediate relay station 20 and the access relay station 22 may represent or be used to determine the BS-AR propagation information $t_{IR-AR}$.

The intermediate relay station 20 may also provide the relay link metrics for the relay link 24 between the intermediate relay station 20 and the access relay station 22 along with the access link metrics to the base station 18. The base station 18 may monitor relay link metrics for the relay link 24 residing between the intermediate relay station 20 and the base station 18, and determine a hop time for the relay link 24 residing between the base station 18 and the intermediate relay station 20. As noted, the base station 18 receives relay link metrics from the intermediate relays station 20 for the relay link 24 between the intermediate relay station 20 and the access relay station 22. As such, the base station 18 has relay link metrics for both relay links 24 that reside between the base station 18 and the access relay station 22. The relay link metrics for these relay links 24 may represent or be used to determine the BS-AR propagation information $t_{BS-AR}$.

The BS-AR and IR-AR propagation information may take various forms and be derived from different types of relay link metrics. For example, the relay link metrics for a given relay link may represent an aggregate of the transmission times, delays, or throughput over the link for PDUs that belong to a given QoS class regardless of their destination, for PDUs being sent to or from a given user terminal 12, for PDUs that are associated with a given service flow, for PDUs that are associated with a given type of service flow, or the like. The relay link metrics for multiple relay links 24 may be further aggregated to determine normalized link metrics for some or all of the relay links 24 along the BS-AR tunnel 28.

With reference to FIG. 4, a link log LL for downlink session flows may be used to deliver the link metrics from one station to another. The relay link metrics may represent, correspond to, or be used to derive the BS-AR propagation information or IR-AR propagation information, which were used for scheduling as described in association with example provided in FIGS. 3A-3C. The link log LL may be configured as a template with fields that can be populated by the different stations for the different link metrics. For downlink session flows, the access link metrics (AR-UT) may be provided in a first field of the link log LL by the access relay station 22. The access relay station 22 will forward the link log LL to the intermediate relay station 20. The relay link metrics for the relay link 24 between the intermediate relay station 20 and the access relay station 22 (IR-AR) may be provided in a second field in the link log LL by the intermediate relay station 20. The intermediate relay station 20 will forward the populated link log LL to the base station 18, wherein the link log LL may have the access link metrics (AR-UT) as well as the relay link metrics (IR-AR) for the relay link 24 that resides between the intermediate relay station 20 and the access relay station 22. As indicated, the base station 18 may monitor the relay link metrics for the relay link 24 that resides between the intermediate relay station 20 and the base station 18 (BS-IR). Accordingly, the base station 18 will have access to the relay link metrics for each of the relay links 24 between the base station 18 and the access relay station 22. The link log LL will support any number of intermediate relay stations 20.

For the communication flow described in association with FIGS. 3A-3C, the base station 18 was the ingress station, while the access relay station 22 was the egress station, and as such, PDUs flowed from the base station 18 to the access relay station 22 through the BS-AR tunnel 28. The present invention is equally applicable for uplink communications, wherein the access relay station 22 is the ingress station and the base station 18 is the egress station. As such, PDUs are delivered from the access relay station 22 to the base station 18 through one or more intermediate relay stations 20 via an AR-BS tunnel. The AR-BS tunnel is not shown, but is similar to the BS-AR tunnel 28. The reversal of the nomenclature, BS-AR to AR-BS, signifies the direction of service flow. An example of how the present invention applied to uplink communications is provided in the communication flow of FIGS. 5A-5C.

For a given service flow, the access relay station 22 may obtain the corresponding QoS class information or the QoS profile from the base station 18 through the intermediate relay station 20 (steps 200 and 202). This information may be provided directly by the base station 18 or retrieved from another service node by the access relay station 22 based on information received from the base station 18. The access relay station 22 may identify the latency information $t_{LAT}$ from the QoS profile (step 204). As described above, the latency information $t_{LAT}$ corresponds to the maximum amount of time allowed for a PDU to travel from the access relay station 22 to the base station 18 through the AR-BS tunnel. When a PDU for the corresponding service flow is received by the access relay station 22 from the user terminal 12 (step 206), the access relay station 22 will identify and store the access relay station arrival time ($t_{ARA}$) (step 208). The access relay station 22 will then determine the network delivery deadline ($t_{NDL}$) based on the access relay station arrival time $t_{ARA}$ and the latency information $t_{LAT}$ (step 210). The network delivery deadline $t_{NDL}$ represents the time or frame at or before which the PDU must be delivered over the core network 14 by the base station 18. For example, the network delivery deadline $t_{NDL}$ may be calculated by adding the latency information $t_{LAT}$ to the access relay station arrival time $t_{ARA}$, wherein $t_{NDL}=t_{ARA}+t_{LAT}$.

At this point, the access relay station 22 knows when the PDU must be delivered by the base station 18 over the core network 14. The access relay station 22 must next take steps to ensure the PDU is delivered to the base station 18 prior to the network delivery deadline $t_{NDL}$. In one embodiment, the access relay station 22 will calculate a second relay link delivery deadline ($t_{RDL2}$) based on the network deliver time $t_{NDL}$ and AR-BS propagation information ($t_{AR-BS}$) (step 212). The second relay link delivery deadline $t_{RDL2}$ represents the time or frame on or before which the PDU should be delivered to the intermediate relay station 20 over the second relay link 24. The AR-BS propagation information $t_{AR-BS}$ corresponds to an amount of time it takes a PDU to travel from the access relay station 22 to the base station 18 via the AR-BS tunnel. In this example, the second relay link delivery deadline $t_{RDL2}$ is calculated by subtracting the AR-BS propagation information $t_{AR-BS}$ from the network delivery deadline $t_{NDL}$, wherein $t_{RDL2}=t_{NDL}-t_{AR-BS}$.

At this point, the access relay station 22 knows the latest time or frame at which the PDU should be delivered to the intermediate relay station 20. Prior to delivering the PDU to the intermediate relay station 20, the access relay station 22 will attach the QoS class information and the network delivery deadline $t_{NDL}$ in a header or body of the PDU (step 214). The access relay station 22 will then transmit the PDU to the intermediate relay station 20 on or before the second relay link delivery deadline $t_{RDL2}$ (step 216). In a preferred embodiment, the QoS class information and network link delivery deadline is provided in the same or different subheaders in a MAC PDU; however, the information may be delivered with the PDU in any manner. If multiple PDUs from the same or different user terminals 12 end up having the same second relay link delivery deadline $t_{RDL2}$, the QoS class information associated with the PDUs may be used to break ties among the PDU delivery times. Accordingly, the PDU is delivered to the intermediate relay station 20 and will include the QoS class information and the network delivery deadline $t_{NDL}$ (step 218).

At this point, the intermediate relay station 20 must schedule the PDU for delivery to the base station 18, such that the PDU is delivered to the base station 18 in sufficient time for the base station 18 to deliver the PDU over the core network 14 prior to the network delivery deadline $t_{NDL}$. Accordingly, the intermediate relay station 20 will calculate a first relay link delivery deadline ($t_{RDL1}$) based on the network delivery deadline $t_{NDL}$ and IR-BS propagation information ($t_{IR-BS}$) (step 220). The intermediate relay station 20 may recover the network delivery deadline $t_{NDL}$ from the PDU. The IR-BS propagation information $t_{IR-BS}$ relates to the amount of time it takes a PDU to travel from the intermediate relay station 20 to the base station 18 through the remaining portion of the AR-BS tunnel. In this example, assume the first relay link delivery deadline $t_{RDL1}$ is calculated by subtracting the IR-BS propagation information $t_{IR-BS}$ from the network delivery deadline $t_{NDL}$, wherein $t_{RDL1} = t_{NDL} - t_{IR-BS}$.

At this point, the intermediate relay station 20 knows to schedule the PDU for delivery to the base station 18 on or before the first relay link delivery deadline $t_{RDL1}$. Again, delivery deadlines may correspond to times or frames at or before which a PDU must be delivered. Accordingly, the intermediate relay station 20 will transmit the PDU to the base station 18 on or before the first relay link delivery deadline $t_{RDL1}$ (step 222). Again, the QoS class information that is provided in the PDU by the access relay station 22 may be used to break ties among PDU delivery times. The PDU is delivered to the base station 18 and will include the QoS class information as well as the network delivery deadline $t_{NDL}$ (step 224). The base station 18 will transmit the PDU over the core network 14 on or before the network delivery deadline $t_{NDL}$ provided in the PDU (step 226). Again, the QoS class information provided in the PDU or otherwise known by the base station 18 may be used to break ties among the PDU delivery times. As such, the base station 18 will deliver the PDU over the core network 14 (step 228).

With reference to FIG. 6, a link log LL for uplink session flows may be used to deliver the link metrics from one station to another. The relay link metrics may represent, correspond to, or be used to derive the AR-BS propagation information or IR-BS propagation information, which were used for scheduling as described in association with example provided in FIGS. 5A-5C. As for the link log LL for downlink session flows, the uplink link log LL may be configured as a template with fields that can be populated by the different stations for the different link metrics. For uplink session flows according to the illustrated examples, the relay link metrics for the relay link 24 between the intermediate relay station 20 and the base station 18 (IR-BS) may be provided in a first field of the link log LL by the intermediate relay station 18. The intermediate relay station 20 may forward the populated link log LL to the access relay station 22, wherein the link log LL will have the relay link metrics for the relay link 24 that resides between the intermediate relay station 20 and the base station 18 (IR-BS). The access relay station 22 may monitor the relay link metrics for the relay link 24 that resides between the intermediate relay station 20 and the access relay station 22 (IR-AR). Accordingly, the access relay station 22 will have access to the relay link metrics for each of the relay links 24 between the access relay station 22 and the base station 18. The link log LL will support any number of intermediate relay stations 20.

High level overviews of a base station 18, user terminal 12, and a relay station, such as the intermediate relay station 20 or access relay station 22, are provided below in association with FIGS. 7, 8, and 9. With particular reference to FIG. 7, a base station 18 configured according to one embodiment of the present invention is illustrated. The base station 18 generally includes a control system 32, a baseband processor 34, transmit circuitry 36, receive circuitry 38, one or more antennas 40, and a network interface 42. The receive circuitry 38 receives radio frequency signals bearing information from one or more remote transmitters provided by user terminals 12, intermediate relay stations 20, or access relay stations 22. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. As such, the baseband processor 34 is generally implemented in one or more digital signal processors (DSPs). The received information is then sent toward the core network 14 via the network interface 42 or transmitted toward another user terminal 12 serviced by the base station 18. The network interface 42 will typically interact with the core network 14 via the base station controller 16.

On the transmit side, the baseband processor 34 receives digitized data, which may represent voice, data, or control information, from the network interface 42 under the control of control system 32, which encodes the data for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to one or more of the antennas 40 through a matching network.

With reference to FIG. 8, a fixed or mobile user terminal 12 configured according to one embodiment of the present invention is illustrated. The user terminal 12 will include a control system 44, a baseband processor 46, transmit circuitry 48, receive circuitry 50, one or more antennas 52, and a user interface circuitry 54. The receive circuitry 50 receives radio frequency signals bearing information from one or more remote transmitters provided by base stations 18 or access relay stations 22. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams. The baseband processor 46 processes the digitized received signal to extract the information or data bits conveyed in the received signal. This processing typically comprises demodulation, decoding, and error correction operations. The baseband processor 46 is generally implemented in one or more digital signal processors (DSPs).

For transmission, the baseband processor 46 receives digitized data, which may represent voice, data, or control information, from the control system 44, which it encodes for transmission. The encoded data is output to the transmit circuitry 48, where it is used by a modulator to modulate a carrier signal that is at a desired transmit frequency or frequencies. A power amplifier (not shown) will amplify the modulated carrier signal to a level appropriate for transmission, and deliver the modulated carrier signal to the one or more antennas 52 through a matching network. Various modulation and processing techniques available to those skilled in the art are applicable to the present invention.

With reference to FIG. 9, a relay station 56 configured according to one embodiment of the present invention is illustrated. The relay station may represent an intermediate relay station 20 or an access relay station 22. The relay station 56 generally includes a control system 58, a baseband processor 60, transmit circuitry 62, receive circuitry 64, and one more antennas 66. The receive circuitry 64 receives radio frequency signals bearing information from one or more remote transmitters provided by user terminals 12, other intermediate relay stations 20, access relay stations 22, or base stations 18. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 60 processes the digitized received signal to extract the information or data bits conveyed in the received signal. This processing typically comprises demodulation, decoding, and error correction operations. As such, the baseband processor 60 is generally implemented in one or more digital signal processors (DSPs). The received information is then sent toward transmitted toward a user terminal 12, intermediate relay station 20, access relay station 22, or base station 18 as described below.

On the transmit side, the baseband processor 60 receives digitized data, which may represent voice, data, or control information for transmission. The digitized data is encoded, and the encoded data is output to the transmit circuitry 62, where it is used by a modulator to modulate a carrier signal that is at a desired transmit frequency or frequencies. A power amplifier (not shown) will amplify the modulated carrier signal to a level appropriate for transmission, and deliver the modulated carrier signal to one or more of the antennas 66 through a matching network.

Those skilled in the art will recognize improvements and modifications to the preferred embodiments of the present invention. All such improvements and modifications are considered within the scope of the concepts disclosed herein and the claims that follow.

The invention claimed is:

1. An apparatus comprising:
   a processing element configured to cause an ingress station to:
   receive a plurality of packet data units (PDUs) associated with at least one service flow that is supported by at least one tunnel established with an egress station along a wireless communication access path in which the ingress station resides in a wireless communication environment; and
   for each PDU of the plurality of PDUs:
   identify a quality of service (QoS) class for the PDU;
   determine information bearing on the identified QoS class; and
   deliver the PDU with the information bearing on the identified QoS class to the egress station via the at least one tunnel.

2. The apparatus of claim 1, wherein the ingress station is a base station and the egress station is an access relay station supporting wireless communications with at least one user terminal, which is party to the at least one service flow.

3. The apparatus of claim 1, wherein the egress station is a base station and the ingress station is an access relay station supporting wireless communications with at least one user terminal, which is party to the at least one service flow.

4. The apparatus of claim 1, wherein the information bearing on the identified QoS class comprises scheduling information.

5. The apparatus of claim 1, wherein the processing element is configured to further cause the ingress station to add the information bearing on the identified QoS class to a header of the PDU.

6. The apparatus of claim 1, wherein the information bearing on the identified QoS class is usable to prioritize delivery of packets transmitted to at least one user terminal which is party to the at least one service flow.

7. The apparatus of claim 1, wherein the PDU is delivered to destinations beyond the at least one tunnel between the ingress and egress stations, via the egress station.

8. The apparatus of claim 7, wherein the information bearing on the identified QoS class delivered by the ingress station is applied to the PDU at the egress station.

9. The apparatus of claim 1, wherein the wireless communication access path passes through any number of intermediate relay stations between the ingress station and the egress station.

10. The apparatus of claim 1, wherein the information bearing on the identified QoS class is usable to prioritize delivery of packets transmitted through at least one intermediate relay station between the ingress station and the egress station.

11. A method for operating an egress station, the method comprising:
    receiving, via wireless communications at the egress station, a plurality of packet data units (PDUs) associated with at least one service flow via at least one tunnel established with an ingress station along a wireless communication access path in which the egress station resides in a wireless communication environment; and
    for each PDU of the plurality of PDUs:
    receiving, from the ingress station, with the PDU, information bearing on a quality of service (QoS) class for the PDU, the information determined by the ingress station based on the QoS class identified for the PDU by the ingress station; and
    prioritizing delivery of packets to be transmitted to at least one user terminal, based on the received information.

12. The method of claim 11, wherein the ingress station is a base station and the egress station is an access relay station supporting wireless communications with the at least one user terminal which is party to the at least one service flow.

13. The method of claim 11, wherein the egress station is a base station and the ingress station is an access relay station supporting wireless communications with at least one user terminal, which is party to the at least one service flow.

14. The method of claim 11, wherein the information comprises scheduling information.

15. The method of claim 11, wherein the information bearing on the identified QoS class is included in a header of the packet data unit.

16. The method of claim 11, further comprising:
    delivering, from the egress station, the PDU to destinations beyond the at least one tunnel between the ingress and egress stations.

17. The method of claim 11, wherein the wireless communication access path passes through any number of intermediate relay stations between the ingress station and the egress station.

18. A wireless communication system comprising:
    an ingress station residing in a wireless communication environment and configured to:
    receive a plurality of packet data units (PDUs) associated with at least one service flow that is supported by at least one tunnel established along a wireless communication access path in the wireless communication environment; and for each PDU of the plurality of PDUs:
- identify a quality of service (QoS) class for the PDU;
- determine corresponding information bearing on the identified QoS class; and
- deliver the PDU and the corresponding information via the at least one tunnel; and an egress station configured to:
- receive the plurality of PDUs and the corresponding information for each received PDU via the at least one tunnel established with the ingress station; and
- prioritize delivery of packets to be transmitted to at least one user terminal, based on the received corresponding information for each received PDU.

19. The wireless communication system of claim 18, wherein the ingress station is a base station and the egress station is an access relay station supporting wireless communications with the at least one user terminal which is party to the at least one service flow.

20. The wireless communication system of claim 18, wherein the egress station is a base station and the ingress station is an access relay station supporting wireless communications with at least one user terminal, which is party to the at least one service flow.

* * * * *